Oct. 20, 1970  H. A. SCHWARTZ  3,535,184
METHOD OF BONDING OVERLAPPING PIECES OF ORIENTED
PLASTIC HAVING LOW POWER FACTOR LOSSES
Filed July 12, 1967
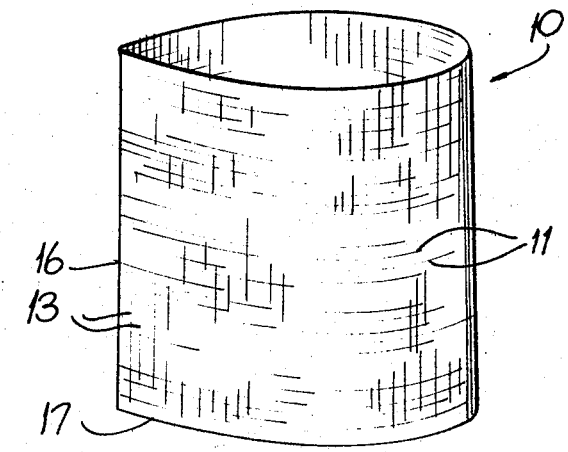
Fig. 1.
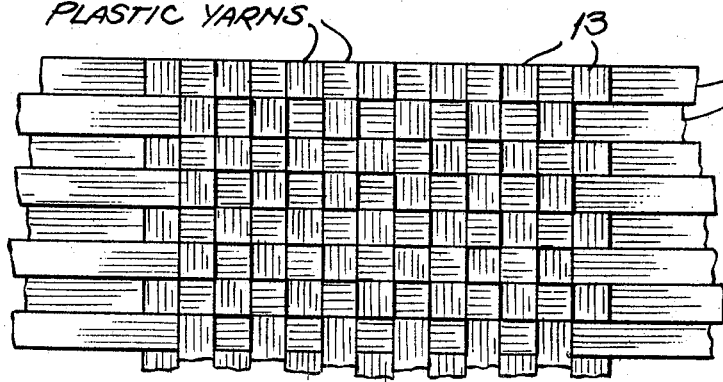
HIGHLY-ORIENTED SYNTHETIC PLASTIC YARNS
Fig. 2.
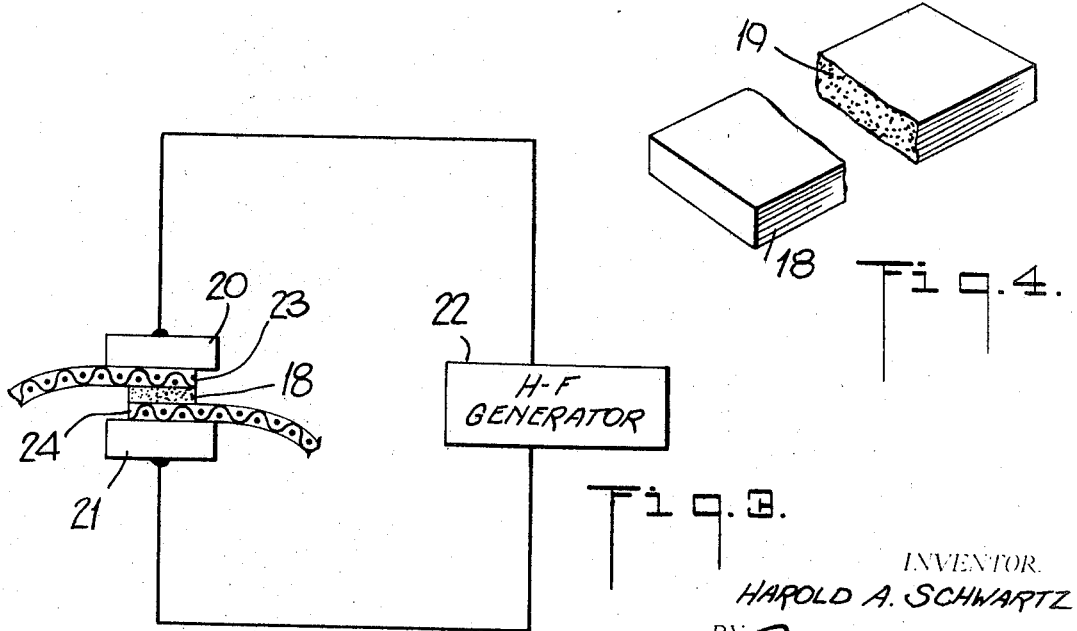
Fig. 4.
Fig. 3.
INVENTOR.
HAROLD A. SCHWARTZ
BY
ATTORNEY

United States Patent Office 3,535,184
Patented Oct. 20, 1970

3,535,184
METHOD OF BONDING OVERLAPPING PIECES OF ORIENTED PLASTIC HAVING LOW POWER FACTOR LOSSES
Harold A. Schwartz, Litchfield, Conn., assignor, by mesne assignments, to Avisun Corporation, Philadelphia, Pa., a corporation of Delaware
Filed July 12, 1967, Ser. No. 652,977
Int. Cl. B29d 23/10
U.S. Cl. 156—273          7 Claims

ABSTRACT OF THE DISCLOSURE

A technique for seaming polypropylene pieces, such as fabrics woven of oriented polypropylene yarn, wherein the edges of the pieces are superposed over a solder strip of thermoplastic material having relatively high power factor losses or having conductive particles dispersed therein, the combination being subjected to a high-frequency field which affects only the solder to cause it to melt and to effect a bond between the pieces which remain dielectrically unheated.

---

This invention relates generally to dielectric heating techniques for seaming two pieces of synthetic material without degrading the material, and more particularly to a method employing a thermoplastic solder which is highly responsive to a high-frequency field.

It is known to weave fabrics of synthetic plastic yarn manufactured in various densities and having a rectangular or circular cross-section. These yarns may be produced from such materials as polypropylene, polyamides such as nylon, polyester or polyacrylic yarns, as well as vinyl and polyethylene material.

For producing high strength fabrics, it is known to orient the yarns mono-axially in the longitudinal direction. This is usually accomplished by hot drawing so as to irreversibly stretch the yarn, thereby orienting its molecular structure.

In making bags or sacks formed of oriented polypropylene yarn, it is only necessary to cut a suitable rectangle of the woven material and to fold same, the long ends of the rectangle being seamed to form a tube, and the short ends being similarly seamed to close the tube into a bag. Polypropylene, when oriented, has exceptionally high strength. If, however, this thermoplastic material is sealed as by heat and pressure, the applied heat adversely affects the orientation of the material, as a consequence of which there is a loss of strength at the seams. Since the loaded bag is subjected to the greater stresses at the seams, particularly at the bottom, the effect of conventional seaming is deleterious to the quality of the bag.

Alternatively, the seams may be formed by sewing the edges with a high-strength thread, but this is a costly and time consuming process. While it is possible also to use adhesives with some synthetic materials, commercially available adhesives have a poor affinity for polypropylene and other high-strength synthetic plastics.

Accordingly, it is the main object of the invention to seam the edges of synthetic plastic fabric pieces using dielectric heating techniques in conjunction with a thermoplastic solder which is rendered molten in the applied field.

More specifically, it is an object of this invention to provide a technique of the above-described type wherein the nature of the solder used is that for a given high-frequency field which has no significant effect on the oriented material being seamed, the solder is caused to fuse to effect the desired bond without impairing the orientation of the material or otherwise degrading it.

Also an object of the invention is to provide an efficient, low cost and rapid technique for the seaming of synthetic plastic material formed of oriented yarns.

Briefly stated, these objects are accomplished by using a solder formed of thermoplastic material preferably having conductive or resistive particles dispersed uniformly therein which produce power factor losses giving rise to internal heating when the solder is exposed to a high frequency field, the field having little heating effect on the material being seamed which has different dielectric properties, whereby the solder melts and adheres to the material to produce the desired bond.

For a better understanding of the invention, as well as other objects and further features thereof, reference is made to the following detailed description to be read in conjunction with the accompanying drawing, wherein:

FIG. 1 is a perspective view of a bag to be seamed by a technique in accordance with the invention;

FIG. 2 is a plan view of the woven fabric used in making the bag;

FIG. 3 is a perspective view of the solder strip; and

FIG. 4 is a sectional view of the dielectric heating apparatus for effecting seaming.

Referring now to FIG. 1, the bag or sack, generally designated by numeral 10, is formed by a fabric composed of horizontally-extending flat warp yarns 11 and transversely-extending flat weft or filler yarns 13. The warp and weft yarns are tightly woven in any known manner on a textile loom to form a sheet-like material relatively free of interstices.

The yarns used for this purpose are ribbon-like synthetic plastic, monofilament yarns manufactured in various densities and having a rectangular cross-section. Such yarns may be produced from any suitable synthetic plastic material, including polypropylene, polyamides such as nylon, polyester or polyacrylic yarns, as well as vinyl and polyethylene yarns. In practice, yarns of 1 to 2 mils thickness and 50 to 200 mils in width are suitable. A preferred weave is 12 x 9 and higher, although weaves of 8 x 8 are satisfactory.

It will be appreciated that by reason of the flat yarn, maximum coverage is obtained with the least amount of weaving, for as compared to round yarns, it requires relatively few yarns per inch to cover a given surface.

It is important that the ribbon-like yarns be highly oriented mono-axially in the longitudinal direction. This is usually accomplished by so drawing the flat yarn or the web from which the flat yarn ribbons are slit, as to irreversibly stretch the yarn or web, thereby orienting the molecular structure of the material. In biaxially oriented yarn or sheeting, the material is stretched both in the transverse and longitudinal directions, but for purposes of the present invention, it is vital that the orientation be carried out mainly in the longitudinal direction.

When the monoaxially oriented synthetic plastic yarns are interwoven, they cross over in the warp and weft directions, and because of their high tear and tensile strength as well as their hydrophilic properties, the resultant fabric is stable. Thus the bag, if properly seamed, is capable of supporting unusually heavy loads without sagging or stretching of the walls.

In shaping the fabric into a sack, it is only necessary to cut a suitable rectangle of the material and to fold same, after which the long ends 16 are seamed to produce a sleeve and the short end 17 is seamed by a marginal fold-over to produce the bottom. While the seam is disclosed herein in connection with a polypropylene bag, it will be appreciated that the technique is useable to seam together pieces of any synthetic fabric formed of oriented yarns to produce a tarpaulin or any other product under circumstances where heating of the fabric material is undesirable.

As shown in FIG. 3, the solder 18 is constituted by a strip of polyethylene or other suitable thermoplastic material having an affinity for the material to be repaired, which strip preferably has carbon 19, graphite, iron filings, or other conductive or electrically semi-conductive or resistant material in fine powder form uniformly dispersed therein. The thermoplastic soldering material has insulating or dielectric properties having a relatively high dielectric constant, which is also the case for the synthetic plastic material to be seamed. However, the normal dielectric characteristics of the plastic solder are modified by the additive, so that it takes much less high frequency power to produce power factor losses giving rise to internal heating sufficient to fuse the solder. It is important that the powder be uniformly dispersed to avoid agglomerations thereof which might give rise to arcing. Also useable as the solder is a thermoplastic material, such as polyvinyl chloride, which has a high power factor loss and which will fuse in the high-frequency field under conditions not affecting the polypropylene.

In dielectric heating, as shown in FIG. 4, the material to be processed is pressed between two electrodes 20 and 21 across which a high-frequency voltage in the frequency range of 2 to 200 megacycles is applied from an oscillator 22 to generate heat within the material.

Interposed between electrodes 20 and 21 are the selvages 23 and 24 of the material to be seamed, which material may be a fabric of oriented polypropylene or other yarns which are otherwise difficult to seal. Sandwiched between the selvages is the solder strip 18. When the voltage is applied the solder is fused, but the selvages which have different dielectric properties are unaffected, the molten solder acting as a bonding agent to seam the selvages together. Hence the selvages remain effectively unheated, their orientation is unimpaired, and a seam of high strength is produced.

It will be appreciated that the soldering technique is not limited to selvages for bags but may be used to seam together pieces of polypropylene material.

While there has been shown a preferred technique according to the invention, it will be evident that changes may be made therein without departing from the essential spirit of the invention as defined in the claims.

What I claim is:

1. A method for seaming two fabric pieces woven of oriented synthetic plastic material whose orentation and strength are adversely affected by heat, said material having low power factor losses, said method comprising the steps of sandwiching between overlapped edges of said oriented pieces a thermoplastic solder having relatively high power factor losses, and subjecting said sandwich to a high frequency field at a frequency and with an intensity which produces heat in said solder but not in the overlapped edges of said pieces and causes said solder to fuse and to bond said edges together without dielectrically heating said edges whereby the orientation and strength of said material is substantially unimpaired.

2. A method as set forth in claim 1, wherein said synthetic material is woven of oriented polypropylene yarn.

3. A method as set forth in claim 1, wherein said solder is formed of a low melting thermoplastic having particles uniformly dispersed therein which particles have electrical characteristics adapted to modify the power factor loss characteristic of the thermoplastic, to cause the solder to have relatively high power factor losses.

4. A method as set forth in claim 3, wherein said thermoplastic is polyethylene.

5. A method as set forth in claim 4, wherein said particles are of carbon powder.

6. A method as set forth in claim 1, wherein said solder is formed solely of polyvinyl chloride material.

7. A method as set forth in claim 1, wherein said edges are the selvages of a woven sheet of polypropylene which when welded together forms a tube.

References Cited

UNITED STATES PATENTS

| | | | |
|---|---|---|---|
| 2,375,585 | 5/1945 | Rimer | 156—218 X |
| 2,444,150 | 6/1948 | Best | 156—218 X |
| 2,440,664 | 4/1948 | Irons | 156—218 X |
| 2,629,953 | 3/1953 | Stackelberg et al. | 156—218 X |
| 2,719,100 | 9/1955 | Banigan | 156—218 X |
| 2,845,736 | 8/1958 | Crawford | 156—217 X |
| 2,936,816 | 5/1960 | Lang | 156—273 X |
| 2,941,577 | 6/1960 | Roseman | 156—273 |
| 3,040,154 | 6/1962 | Marsh | 156—218 X |
| 3,411,542 | 11/1968 | Walsh et al. | 156—218 X |
| 3,336,173 | 8/1967 | Renfroe | 156—273 X |

CARL D. QUARFORTH, Primary Examiner

S. J. LECHERT, JR., Assistant Examiner

U.S. Cl. X.R.

156—157, 217, 218 327, 333